(12) United States Patent
Lee et al.

(10) Patent No.: US 10,623,304 B2
(45) Date of Patent: Apr. 14, 2020

(54) CONFIGURING OPTICAL NETWORKS USING A JOINT CONFIGURATION MODEL

(71) Applicant: Futurewei Technologies, Inc., Plano, TX (US)

(72) Inventors: Young Lee, Plano, TX (US); Italo Busi, Cerro Maggiore (IT); Ricard Vilalta, Barcelona (ES); Haomian Zheng, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 74 days.

(21) Appl. No.: 15/873,521

(22) Filed: Jan. 17, 2018

(65) Prior Publication Data
US 2019/0222506 A1    Jul. 18, 2019

(51) Int. Cl.
| | | |
|---|---|---|
| *H04J 14/02* | (2006.01) | |
| *H04L 12/721* | (2013.01) | |
| *H04L 29/06* | (2006.01) | |
| *H04L 12/801* | (2013.01) | |
| *H04Q 11/00* | (2006.01) | |

(52) U.S. Cl.
CPC ......... *H04L 45/124* (2013.01); *H04J 14/026* (2013.01); *H04J 14/0267* (2013.01); *H04L 45/62* (2013.01); *H04L 47/10* (2013.01); *H04L 69/168* (2013.01); *H04Q 11/0062* (2013.01)

(58) Field of Classification Search
None
See application file for complete search history.

(56) References Cited

U.S. PATENT DOCUMENTS

| | | | | |
|---|---|---|---|---|
| 8,315,518 | B1 * | 11/2012 | Yao | H04J 14/0256 398/45 |
| 9,350,481 | B2 * | 5/2016 | Wei | H04J 14/0257 |
| 9,954,611 | B1 * | 4/2018 | Lee | H04B 10/07957 |
| 2010/0266277 | A1 * | 10/2010 | Koka | H04J 14/0278 398/45 |

(Continued)

FOREIGN PATENT DOCUMENTS

CN         103079119 A      5/2013

OTHER PUBLICATIONS

"International Application No. PCT/CN2019/071838, International Search Report and Written Opinion dated Apr. 18, 2019", (dated Apr. 18, 2019), 9 pgs.

(Continued)

*Primary Examiner* — Duc T Duong
(74) *Attorney, Agent, or Firm* — Schwegman Lundberg & Woessner, P.A.

(57) ABSTRACT

A computer implemented method of configuring an optical path includes selecting with one or more processors a wavelength for the optical path, generating with one or more processors, a first request for a first type of node in the optical path, generating with one or more processors a second request for a second type of node in the optical path, the second type of node having different data plane capabilities than the first type of node, wherein the first and second requests are generated as a function of a joint configuration model accommodating both types of nodes, and sending the first request from the one or more processors to the first type of node and the second request to the second type of node to configure the optical path.

20 Claims, 12 Drawing Sheets

(56) References Cited

U.S. PATENT DOCUMENTS

| | | | |
|---|---|---|---|
| 2013/0308945 A1* | 11/2013 | Dhillon | H04Q 11/0003 |
| | | | 398/48 |
| 2014/0044431 A1 | 2/2014 | Hussain et al. | |
| 2014/0328587 A1* | 11/2014 | Magri | H04L 45/62 |
| | | | 398/26 |
| 2014/0341572 A1* | 11/2014 | Sambo | H04J 14/0257 |
| | | | 398/48 |
| 2015/0104167 A1* | 4/2015 | Bottari | H04B 10/0775 |
| | | | 398/16 |
| 2015/0215688 A1* | 7/2015 | Sambo | H04J 14/0267 |
| | | | 398/48 |
| 2015/0304066 A1* | 10/2015 | Dutti | H04L 43/0864 |
| | | | 398/98 |
| 2017/0353239 A1* | 12/2017 | Takita | H04B 10/07953 |
| 2018/0076920 A1* | 3/2018 | Li | H04J 14/0212 |
| 2018/0175965 A1* | 6/2018 | Nakatsugawa | H04B 10/0793 |
| 2019/0097720 A1* | 3/2019 | Kim | H04B 10/0775 |
| 2019/0140971 A1* | 5/2019 | Guilbeault | H04L 47/70 |

OTHER PUBLICATIONS

King, D., et al., "Transport Northbound Interface: The Need for Specification and Standards Coordination", 21st International Conference on Optical Network Design and Modeling, (May 17, 2017), 5 pgs.

Lopez De Vergara, J. E., et al., "A YANG data model for WSON and Flexi-Grid Optical Networks", CCAMP Working Group, Internet Draft, Universidad Autonoma de Madrid, (Oct. 27, 2014), 42 pgs.

* cited by examiner

```
module: ietf-te-10 ~202
  augment /te/te/tunnels/te:tunnel/te:config: ~204
    +--rw (10-slot)? ~206
    +--:(wson) ~208
    |  +--rw selected frequency?      decimal64 ~210
    |  +--rw channel-spacing?         decimal64 ~212
    +--:(flexi-grid) ~214
       +--rw N?                       int32 ~216
       +--rw M?                       int32 ~218
    +--rw src-client-signal?          identityref ~220
    +--rw dst-client-signal?          identityref ~222
    +--rw wavelenght-assignment?      identityref ~224
  augment /te/te/tunnels/te:tunnel/te:state: ~226
    +--ro (10-slot)? ~228
    +--:(wson) ~230
    |  +--ro selected-frequency?      decimal64 ~232
    |  +--ro channel-spacing?         decimal64 ~234
    +--:(flexi-grid) ~236
       +--ro N?                       int32 ~238
       +--ro M?                       int32 ~240
    +--ro src-client-signal?          identityref ~242
    +--ro dst-client-signal?          identityref ~244
    +--ro wavelenght-assignment?      identityref ~246
  augment /te/te/lsps-state/te:lsp: ~248
    +--ro bidirectional?              boolean ~250
    +--ro (10-slot)? ~252
    +--:(wson) ~254
    |  +--ro selected frequency?      decimal64 ~256
    |  +--ro channel-spacing?         decimal64 ~258
    +--:(flexi-grid) ~260
       +--ro N?                       int32 ~262
       +--ro M?                       int32 ~264
  augment /te:te/te:globals/te:named-path-constraints/te:named-path-
    constraint/te:config: ~266
    +--rw wavelenght-assignment?      identityref ~268
```

FIG. 2B

```
grouping tunnel-properties-10 {            ~300
    description                            ~310
        "Configuration parameters relating to TE L0 TUNNEL
        attributes";
    choice 10-slot {          ~320
        description "This choice allows the selection of technology
            specifics.";
 325~   case wson {
            description "Configuration parameters relating to TE WSON TUNNEL
                attribute flags";

leaf selected-frequency {
                type decimal64 {
                    fraction-digits 5;
                }
                units THz;
                default 193.1;
                description "Selected Central Frequency";
            }
            leaf channel-spacing {
                type decimal64 {
                    fraction-digits 5;
                }
                units GHz;
                description "This is fixed channel spacing for
                    WSON, e.g, 12.5, 25, 50, 100, ..";
            }
        }
```

```
330 ⎯ case flexi-grid {
         description "Configuration parameters relating to TE FLEXI-GRID
             TUNNEL attribute flags";
         reference "rfc7698";
         leaf N {
             type int32;
             description
                 "Is used to determine the Nominal Central
                  Frequency. The set of nominal central frequencies
                  can be built using the following expression:
                      f = 193.1 THz + n x 0.00625 THz,
                  where 193.1 THz is ITU-T 'anchor frequency' for
                  transmission over the c band, n is positive or
                  negative integer including 0.";
             reference "rfc7698";
         }
         leaf M {
             type int32;
             description
                 "Is used to determine the slot width. A slot width
                  is constrained to be M x SWG (that is, M x 12.5 GHz).
                  where M is an integer greater than or equal to 1.";
             reference "rfc7698";
         }
      }
```

CONFIGURING OPTICAL NETWORKS USING A JOINT CONFIGURATION MODEL

TECHNICAL FIELD

The present disclosure is related to configuring optical networks, and in particular to using a joint configuration model to configure diverse optical networks to form an optical path.

BACKGROUND

Optical networks may involve the use of different types of nodes, such as wavelength switched optical networks (WSON) nodes and newer, higher bandwidth flexible grid (Flexi-Grid) nodes. The different types of nodes utilize different configurations and methods of describing channel parameters, such as frequencies and channel separation frequencies.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a computer implemented method of configuring an optical path includes selecting with one or more processors a wavelength for the optical path, generating with one or more processors, a first request for a first type of node in the optical path, generating with one or more processors a second request for a second type of node in the optical path, the second type of node having different data plane capabilities than the first type of node, wherein the first and second requests are generated as a function of a joint configuration model accommodating both types of nodes, and sending the first request from the one or more processors to the first type of node and the second request to the second type of node to configure the optical path.

Optionally, in any of the preceding aspects, a further implementation of the aspect includes wherein the first and second types of nodes have wavelength data plane capabilities that are specified differently in their respective requests.

Optionally, in any of the preceding aspects, a further implementation of the aspect includes wherein the first and second requests are generated and sent via one or more processors of a provisioning network controller node in communication with the first and second types of nodes.

Optionally, in any of the preceding aspects, a further implementation of the aspect includes wherein the first and second requests are generated responsive to a multi-domain service coordinator having one or more processors communicatively coupled to heterogeneous provisioning network controller nodes, each controller node in communication with multiple first or second type nodes in the optical path.

Optionally, in any of the preceding aspects, a further implementation of the aspect includes wherein the first type of node comprises a wavelength switched optical network (WSON) node and the second type of node comprises a Flexi-Grid node.

Optionally, in any of the preceding aspects, a further implementation of the aspect includes wherein the first request specifies a path frequency and channel spacing of the optical path and the second request specifies the path frequency and channel spacing as a function of a multiple of slot widths of the Flexi-Grid node to match the channel spacing specified for the WSON node.

Optionally, in any of the preceding aspects, a further implementation of the aspect includes wherein the first request for the WSON directly specifies the path frequency ($f_p$) and channel spacing ($f_{cs}$), and the second request for the Flexi-Grid node specifies the path frequency as ($f_p=f_p+n\times 0.00625$) where n=0, and channel spacing as ($f_{cs}=M\times 12.5$) where M=4. Optionally, in any of the preceding aspects, a further implementation of the aspect includes wherein the joint configuration model comprises a compiled YANG tree.

Optionally, in any of the preceding aspects, a further implementation of the aspect includes wherein the first and second requests are hypertext transfer protocol (HTTP) POST requests.

According to one aspect of the present disclosure, an optical network node controller includes a memory storage comprising instructions and one or more processors in communication with the memory storage, wherein the one or more processor execute the instructions to perform operations. The operations include selecting with one or more processors a wavelength for an optical path, generating with one or more processors, a first request for a first type of node in the optical path, generating with one or more processors a second request for a second type of node in the optical path, the second type of node having different data plane capabilities than the first type of node, wherein the first and second requests are generated as a function of a joint configuration model accommodating both types of nodes, and sending the first request from the one or more processors to the first type of node and the second request to the second type of node to configure the optical path.

Optionally, in any of the preceding aspects, a further implementation of the aspect includes wherein the first and second requests are generated responsive to a multi-domain service coordinator having one or more processors communicatively coupled to heterogeneous provisioning network controller nodes, each controller node in communication with multiple first or second type nodes in the optical path.

Optionally, in any of the preceding aspects, a further implementation of the aspect includes wherein the first type of node comprises a wavelength switched optical network (WSON) node and the second type of node comprises a Flexi-Grid node.

Optionally, in any of the preceding aspects, a further implementation of the aspect includes wherein the first request specifies a path frequency and channel spacing of the optical path and the second request specifies the path frequency and channel spacing as a function of a multiple of slot widths of the Flexi-Grid node to match the channel spacing specified for the WSON node.

Optionally, in any of the preceding aspects, a further implementation of the aspect includes wherein the first request for the WSON directly specifies the path frequency ($f_p$) and channel spacing ($f_{cs}$), and the second request for the Flexi-Grid node specifies the path frequency as ($f_p=f_p+n\times 0.00625$) where n=0, and channel spacing as ($f_{cs}=M\times 12.5$) where M=4.

Optionally, in any of the preceding aspects, a further implementation of the aspect includes wherein the joint configuration model comprises a compiled YANG tree and wherein the first and second requests are in the form of hypertext transfer protocol (HTTP) POST requests.

According to one aspect of the present disclosure, a non-transitory computer-readable media storing computer instructions for configuring nodes in an optical network, that when executed by one or more processors, cause the one or more processors to perform steps of selecting with one or more processors a wavelength for an optical path, generating with one or more processors, a first request for a first type of node in the optical path, generating with one or more processors a second request for a second type of node in the optical path, the second type of node having different data plane capabilities than the first type of node, wherein the first and second requests are generated as a function of a joint configuration model accommodating both types of nodes, and sending the first request from the one or more processors to the first type of node and the second request to the second type of node to configure the optical path.

Optionally, in any of the preceding aspects, a further implementation of the aspect includes wherein the first and second types of nodes have wavelength data plane capabilities that are specified differently in their respective requests.

Optionally, in any of the preceding aspects, a further implementation of the aspect includes wherein the first type of node comprises a wavelength switched optical network (WSON) node and the second type of node comprises a Flexi-Grid node, and wherein the first request specifies a path frequency and channel spacing of the optical path and the second request specifies the path frequency and channel spacing as a function of a multiple of slot widths of the Flexi-Grid node to match the channel spacing specified for the WSON node.

Optionally, in any of the preceding aspects, a further implementation of the aspect includes wherein the first request for the WSON directly specifies the path frequency ($f_p$) and channel spacing ($f_{cs}$), and the second request for the Flexi-Grid node specifies the path frequency as ($f_p = f_p + n \times 0.00625$) where n=0, and channel spacing as ($f_{cs} = M \times 12.5$) where M=4.

Optionally, in any of the preceding aspects, a further implementation of the aspect includes wherein the first and second requests are in the form of hypertext transfer protocol (HTTP) POST requests.

BRIEF DESCRIPTION OF THE DRAWINGS

FIG. 2B is pseudocode for a joint YANG (Yet Another Next Generation) model for configuring controller nodes in an optical network according to an example embodiment.

FIGS. 3A and 3B are a commented representation of a container representing the YANG model of FIG. 2 according to an example embodiment.

DETAILED DESCRIPTION

Figure 1:
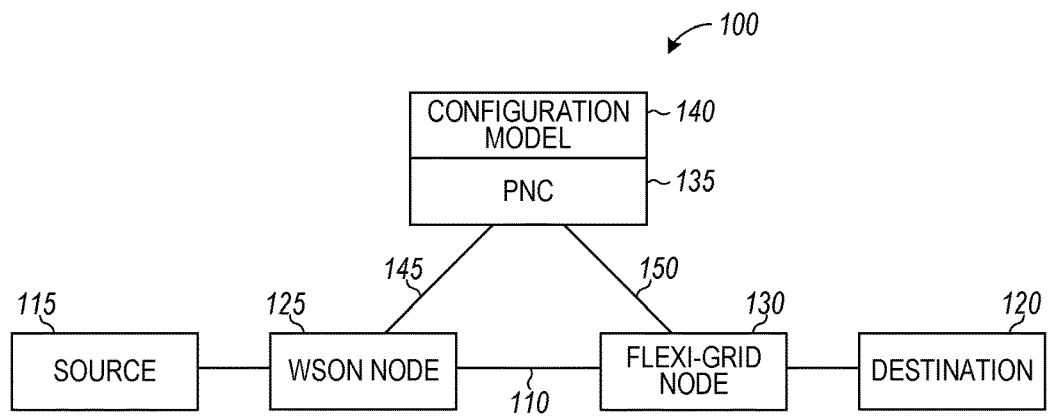
FIG. 1 is a block diagram of an optical network showing an optical path extending between a source and a destination according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Optical networks may involve the use of different types of nodes along an optical path between a source and destination, such as WSON nodes and newer, higher bandwidth Flexi-Grid nodes. Nodes in an optical network may be capable of one or more of switching optical signals and regeneration of optical signals. The optical path may be bidirectional or unidirectional.

The different types of nodes utilize different configurations and methods of describing channel parameters, such as frequencies and channel separation frequencies. Optical network controllers configure the nodes using different configuration models for each type of node to establish one or more optical paths.

When optical networks are mixed with Fixed-Grid (WSON) and Flexible-Grid (Flexi-Grid) nodes, both types of nodes need to be supported to properly configure an optical path in the network.

During migration of an optical network from older type nodes to newer nodes, a control plane mechanism used to configure the nodes for providing an optical path for communications has to change when an older node is replaced with a newer node. Changing the mechanism for each replaced node becomes time consuming and subject to error, adding expense to the migration.

Various aspects of the inventive subject matter facilitate the use of a joint configuration model by a controller, referred to as a provisioning network controller (PNC) to control both WSON and Flexi-Grid nodes to configure an optical path. The PNC does not need to change the configuration model when WSON networks migrate to Flexi-Grid networks, allowing for easier migration.

A multi-domain controller, referred to as a multi-domain service coordinator (MDSC) may use one configuration interface to each homogenous or heterogeneous PNC, such as one or more PNCs that control domains having WSON nodes, PNCs that control domains having Flexi-Grid nodes, and PNCs that control domains having mixed nodes, such as one or more WSON nodes and Flexi-Grid nodes. In further embodiments, the configuration model may be modified to support more types of nodes with similar advantages.

FIG. 1 is a block diagram of an optical network 100 showing an optical path 110 extending between a source 115 and a destination 120. The optical path 110 traverses through a first node 125 and a second node 130, both of which are configured by a controller, PNC 135, to establish the optical path. The first and second nodes 125, 130 may be different. In one example embodiment, the first node 125 is a WSON node, and the second node is a newer, higher bandwidth Flexi-Grid node 130. Both such nodes have different data plane capabilities and are controlled differently in order to configure the single optical path 110. A WSON node may perform switching selectively based on a center wavelength of an optical signal and has a fixed 50 Ghz slot width. Flexi-grid nodes perform switching based on a center wavelength but with variable size slot width.

PNC 135 utilizes a joint configuration model 140 in order to control the nodes 125 and 130 via connections 145 and 150, respectively, and configure them for data plane based operations. Configuration model 140 may be used to configure first node 125 by specifying, for example, a selected frequency of 193.1 (THz) and a channel spacing of 50 (GHz). For the sample optical path 110, configuration model 140 may be used by PNC 135 to configure second node 130 by setting N=0 (f=193.1 THz+N×000625 THz=193.1 THz), and, M=4 (width=M×12.5 GHz=50 GHz). The configuration model 140 may be stored and accessed within PNC 135, or stored and accessed remote from PNC 135 in various embodiments. The difference in configuring the two nodes is that the second node 130 is a Flexi-Grid node, which has a higher bandwidth capability, both in terms of selected frequency, with a base frequency of 193.1 THz and a more granular channel spacing capability. Flexi-Grid nodes are able to fit four channels into a same frequency range as a WSON node.

Figure 2A:
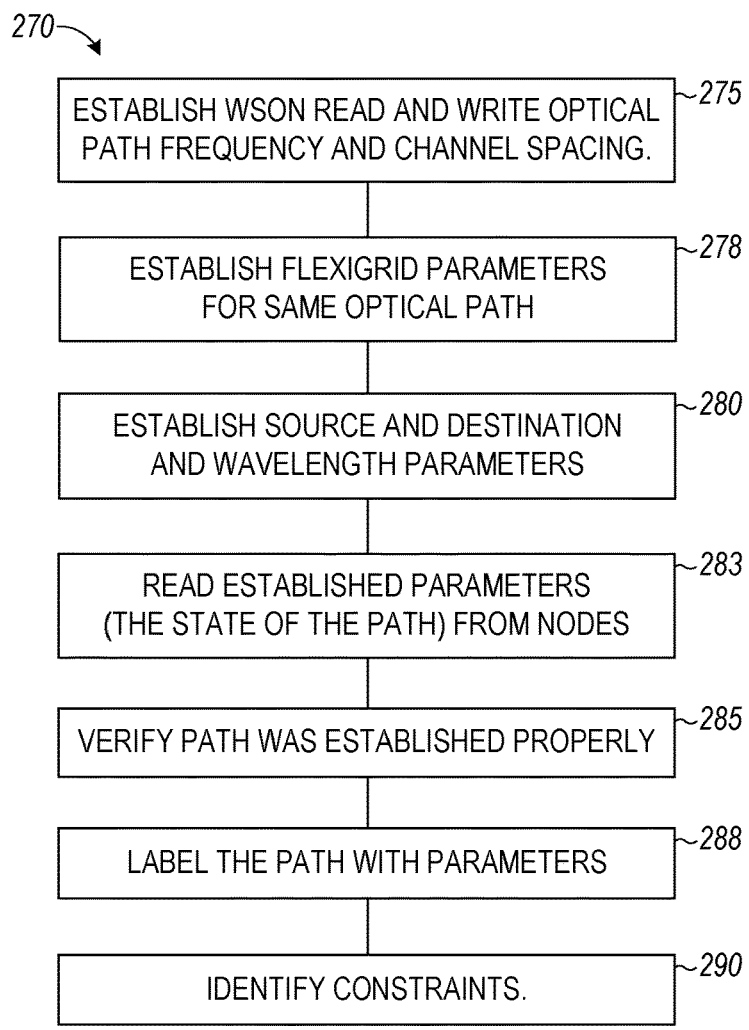
FIG. 2A is a flowchart illustrating a method for establishing an optical path in a network of different types of nodes according to an example embodiment.

FIG. 2A is a flowchart illustrating a method 270 for establishing an optical path in a network of different types of nodes. At operation 275, path frequency and channel spacing are specified for a WSON read and write optical path. At operation 278, the same path frequency and channel spacing are specified for a Flexi-Grid optical path using a different nomenclature that is compatible with Flexi-Grid nodes.

At operation 280, source and destination are established, along with wavelength parameters. The established parameter, referred to as the state of the path are then read at operation 283 from the nodes in the path. The read parameters are verified at operation 285 to ensure the path was properly established. At operation 288, the path is labeled with the parameters, and at operation 290, constraints of the path, if any, are identified.

In one embodiment, the configuration model may be expressed as an Internet Engineering Task Force (IETF) YANG tree as shown in pseudocode in FIG. 2 at YANG model 200 describing operations for establishing an optical path (te:tunnel (traffic engineered tunnel)), referred to in the pseudocode as a module named ietf-te-L0 at 202. Operation 204 describes that language from an already established model compiled YANG model is being borrowed for use in YANG model 200 and begins configuration (config) of nodes in the path. Operation 206 is used to describe that the path to be established is a read/write (rw) te L0 slot, while line 208 indicates that the following operations are for WSON nodes, identifying the channel frequency at 210 as a 64 bit decimal format and channel spacing at 212 as a 64 bit decimal format. A te L0 slot is a traffic engineering slot with L0 being a container of YANG to describe Layer 0 Slot of the tunnel between nodes to be configured.

Operation 214 is used to identify that following operations are for Flexi-Grid nodes and identify parameter N as a 32 bit integer at 216 and M as a 32 bit integer at 218. For one example optical path 110, N=0 (f=193.1 THz+N× 000625 THz=193.1 THz), and, M=4 (width=M×12.5 GHz=50 GHz). Operations 220 and 222 define the source client signal and destination client signal. Operation 224 describes the wavelength assignment for the path.

Operation 226 causes a read of what was configured, the state of the path. Operations 228, 230, 232, 234, 236, 238, 240, 242, 244, and 246 have a similar format to the above configuration operations 206-224, and serve to read values from configured nodes to ensure configuration of WSON and Flexi-Grid nodes was performed properly.

Operation 248 is used to label a switched path (lsp) corresponding to the optical path through multiple nodes in the optical network. Operation 250 indicates whether the path is bidirectional or unidirectional and is a Boolean value. Note that the while YANG model 200 uses specified numbers of bits or types of values, different numbers of bits or types of values may be used in other embodiments. Operations 252, 254, 256, 258, 260, 262, and 264 are similar to the above sets of operations and describe the selected channel frequency and spacing for the WSON and Flexi-Grid nodes.

Operation 266 is used to identify constraints, such as shown at operation 268 wherein an rw wavelength assignment is identified. The assignment may be set via random assignment as show, or globally, which allows direct identification of the wavelength to allow tailoring for a specific instance of a path.

FIGS. 3A and 3B are a commented representation of a container: L0-slot that illustrates the YANG model of FIG. 2 shown generally at 300. A grouping of tunnel properties is illustrated at 310 where configuration parameters relating to TE L0 Tunnel attributes are specified.

A choice at 320 allows the selection of technology specifics, such as the WSON case 325 and the Flexi-Grid case 330. WSON case 325 includes the configuration parameters relating to TE WSON Tunnel attribute flags, such as leaf (channel) selected frequency, type, units of THz, default channel frequency 193.1 THz, and leaf channel spacing which is 12.5 GHz for WSON nodes.

Case 330 shows technology specifics of Flexi-Grid nodes, such as configuration parameters N and M. For Flexi-Grid nodes, N is used to determine the Nominal Central Frequency. The set of nominal central frequencies can be built using the following expression: f=193.1 THz+n×0.00625 THz, where 193.1 THz is ITU-T "anchor frequency" for transmission over the C band, and n is a positive or negative integer including 0. M is used to determine the slot width. A slot width is constrained to be M×SWG (slot width grid) (that is, M×12.5 GHz), where M is an integer greater than or equal to 1. Note that even further different types of nodes may be similarly calculated once the frequency and channel spacing is specified for any one of the types of nodes in the format utilized for such type of node.

Figure 4:
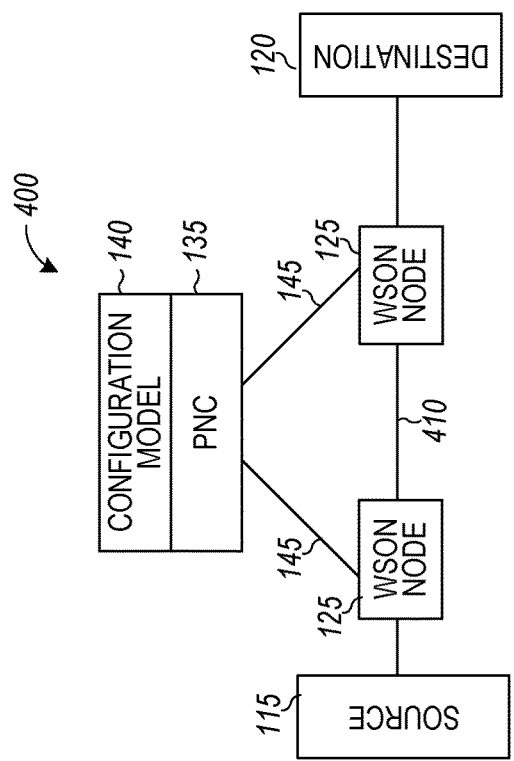
FIG. 4 is a block diagram of an optical network showing an optical path extending between a source and a destination according to an example embodiment.

FIG. 4 is a block diagram of an optical network 400 showing an optical path 410 extending between a source 115 and a destination 120. Note that reference numbers are used for like components in each of the optical network figures. Each of the optical network figures show only the nodes and controllers used for establishing an optical path. The optical networks may consist of many other nodes and optical connections that are not used for the illustrated optical path and are not shown for convenience of illustration.

The optical path 410 traverses through two WSON nodes 125, both of which are configured by a controller, PNC 135, to establish the optical path. Both nodes have the same data plane capabilities.

PNC 135 utilizes the joint configuration model 140 in order to control the nodes via connections 145 and configure them for data plane based operation. Configuration model 140 may be used to configure both nodes 125 by specifying, for example, a selected frequency of 193.1 (THz) and a channel spacing of 50 (GHz).

Figure 5:
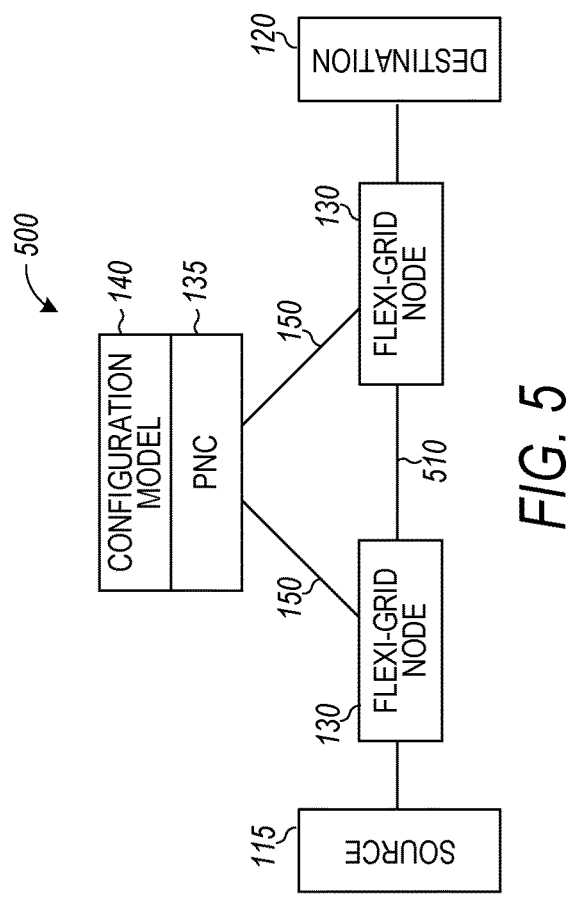
FIG. 5 is a block diagram of an alternative optical network showing an optical path extending between a source and a destination according to an example embodiment.

FIG. 5 is a block diagram of an optical network 500 showing an optical path 510 extending between a source 115 and a destination 120. The optical path 510 traverses through a pair of nodes 130, both of which are configured by a controller, PNC 135, to establish the optical path. Nodes 130 are both Flexi-Grid nodes.

PNC 135 utilizes a joint configuration model 140 in order to control the nodes via connections 150 and configure them for data plane based operation. Configuration model 140 may be used to configure nodes 130 by setting N=0 (f=193.1 THz+N×000625 THz=193.1 THz), and, M=4 (width=M× 12.5 GHz=50 GHz). In one embodiment, the nodes 130 may have been upgraded or migrated from WSON nodes as shown in FIG. 4. The use of a joint configuration model for multiple types of nodes allows such migration without having to modify the configuration model during the migration.

Figure 6A:
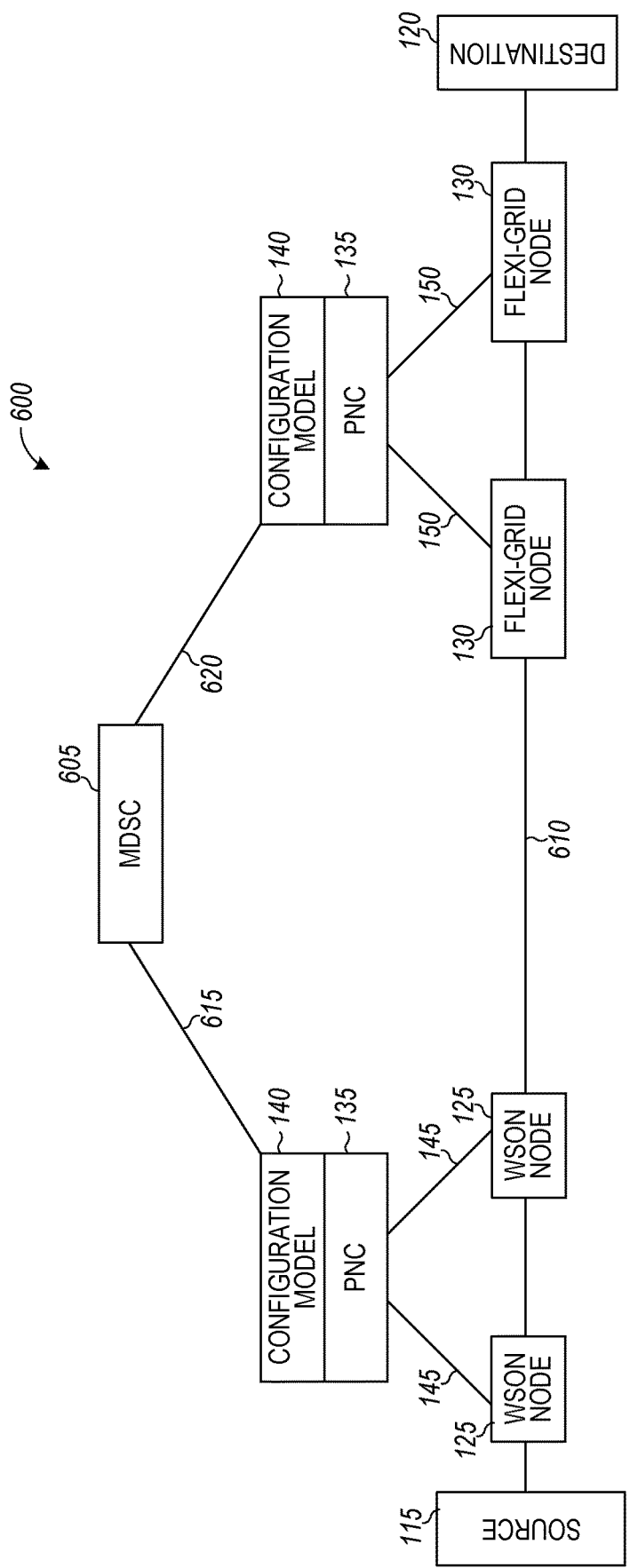
FIG. 6A is a block diagram of a further alternative optical network showing an optical path extending between a source and a destination according to an example embodiment.

FIG. 6A is a block diagram of an optical network 600 showing an optical path 610 extending between a source 115 and a destination 120. The optical path 610 traverses through multiple pairs of nodes 125 and 130, which are configured by a pair of controllers, both shown as PNC 135, to establish the optical path. Nodes 125 are both WSON nodes in a domain controlled by one PNC 135 while nodes 130 are both Flexi-Grid nodes in a domain controlled by another PNC 135.

PNC 135 utilizes a joint configuration model 140 in order to control the nodes via connections 150 and configure them for data plane based operation as described above. A controller, such as a multiple domain service coordinator (MDSC) 605 is used to control both PNCs 135 via one configuration interface as indicated by connections 615 and 620. Such control may be done without regard to the different types of nodes in the different domains.

Figure 6B:
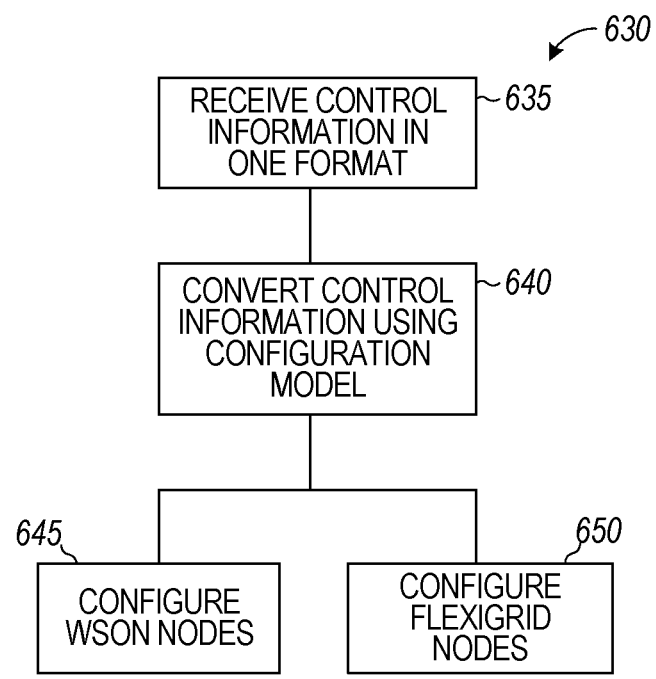
FIG. 6B is a flowchart illustrating a method to configure different type nodes for data plane based operation according to an example embodiment.

FIG. 6B is a flowchart illustrating a method 630 of controlling nodes via the connections 150 to configure them for data plane based operation. At operation 635, each PNC 135 will receive control information from MDSC 605, such as frequency and channel spacing information in a single format and convert such control information using the configuration model 140 as indicated at operation 640. At operation 645, the PNC 135 coupled to the WSON nodes 125 configures the WSON nodes 125 with the proper frequency and channel spacing. Responsive to operation 640, the PNC 135 coupled to the Flexi-Grid nodes 130 configures the Flexi-Grid nodes with the converted control information to operate at the same frequency and channel spacing. MDSC 605 also selects and coordinates the PNCs to establish the tunnel, i.e., the optical path 610.

In one embodiment, the nodes 130 may have been upgraded or migrated from WSON nodes. The use of a joint configuration model 140 for multiple types of nodes 125, 130 allows such migration without having to modify the configuration model during the migration. Migration of the entire optical network may occur over time, without having to upgrade the entire network at the same time and without having to change the joint configuration model during that time.

Figure 7:
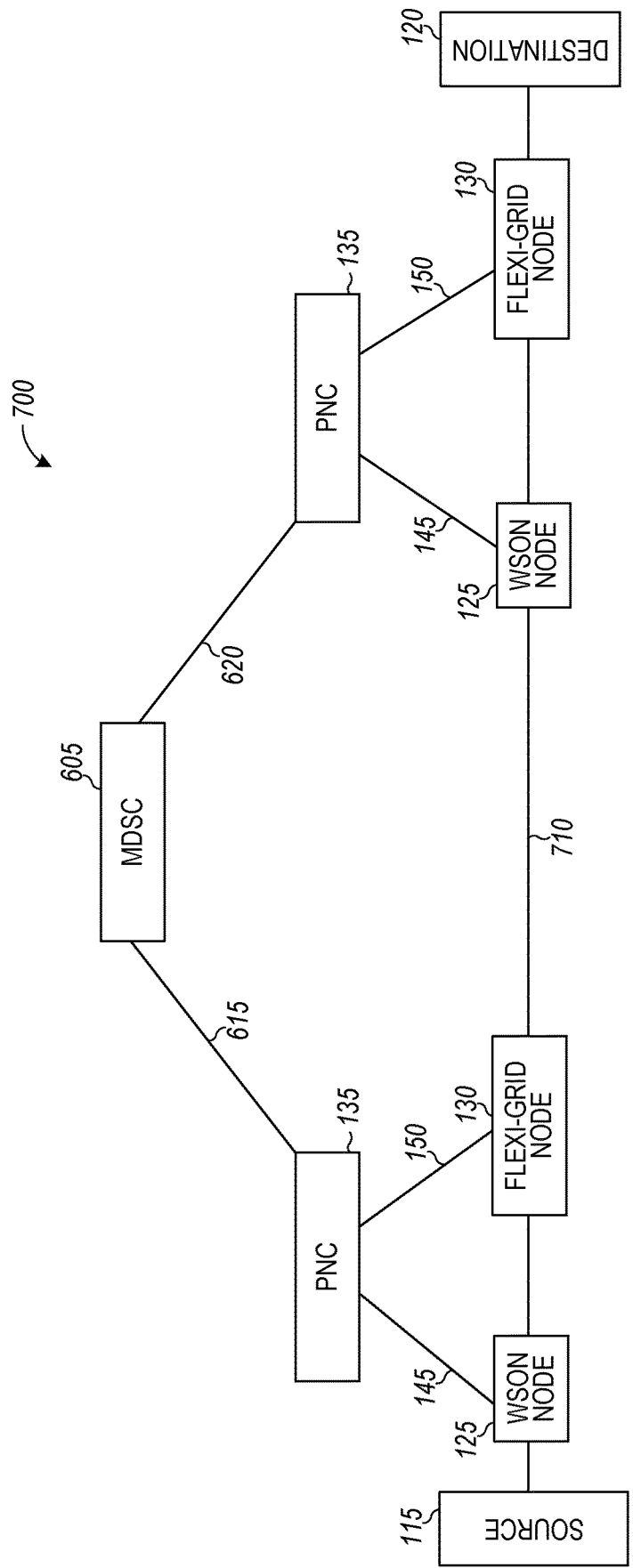
FIG. 7 is a block diagram of an optical network showing yet a further alternative optical path extending between a source and a destination according to an example embodiment.

FIG. 7 is a block diagram of an optical network 700 showing an optical path 710 extending between a source 115 and a destination 120. The optical path 710 traverses through multiple nodes 125 and 130 in different, mixed node domains. The nodes are all configured by a PNCs 135, to establish the optical path. Domains with mixed nodes, both WSON nodes and Flexi-Grid nodes are each controlled by a PNC 135. Method 635 may be executed by each PNC 135 to configure their respective WSON node and Flexi-Grid node.

PNC 135 utilizes a joint configuration model 140 (not shown here) in order to control the nodes via connections 145 and 150 and configure them for data plane based operation as described above. An MDSC 605 is used to control both PNCs 135 via one configuration interface as indicated by connections 615 and 620. Such control may be done without regard to the different types of nodes in the different domains. Each PNC 135 will receive control information from MDSC 605, such as frequency and channel spacing information in a single format and convert such control information using the configuration model 140. MDSC 605 also selects and coordinates the PNCs to establish the tunnel, i.e., the optical path 610.

Figure 8:
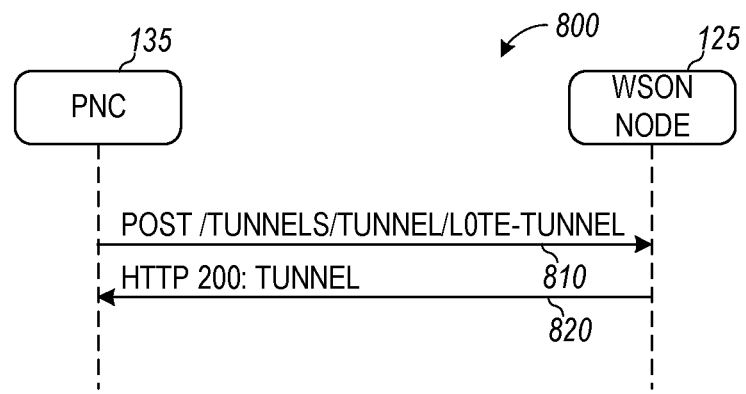
FIG. 8 is a diagram showing configuration message flow for configuring an optical path or tunnel via a first type of control node in an optical network according to an example embodiment.

FIG. 8 is a diagram showing configuration message flow 800 for configuring an optical path or tunnel in an optical network. Flow 800 establishes a LOTE-tunnel (Layer zero, traffic engineered-tunnel), at one or more WSON nodes 125 by one or more PNCs 135 in one embodiment, but other types of optical paths may be established in a similar manner. A first control request 810, POST/tunnels/tunnel/ LOTE-tunnel is a communication sent from PNC 135 to WSON node 125 to establish tunnel or optical path. WSON node 125 processes the command and returns a confirmation 820 of HTTP 200: Tunnel, confirming that the tunnel has been established. POST is an HTTP (hyper text transfer protocol) message that tells the receiver to "configure" the optical path. In this case, the message informs the receiver to configure the optical path based on YANG model container called tunnels/tunnel/LOTE-tunnel. HTTP 200 is a status code indicating that the request has succeeded. A POST is a request in HTTP.

Figure 9:
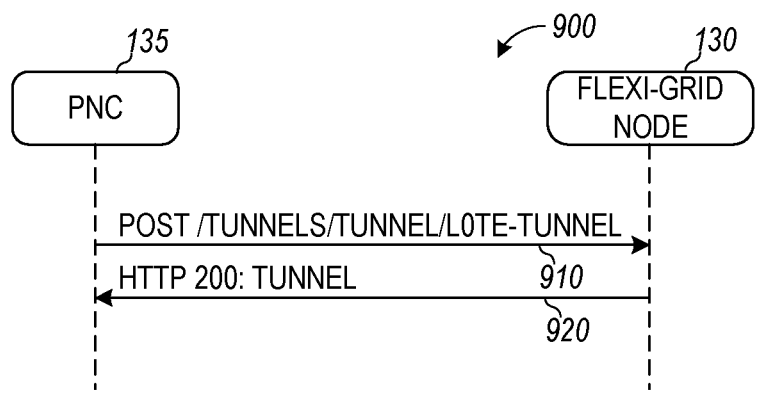
FIG. 9 is a diagram showing configuration message flow for configuring an optical path or tunnel via a second type of control node in an optical network according to an example embodiment.

FIG. 9 is a diagram showing configuration message flow 900 for configuring an optical path or tunnel in an optical network. Flow 900 establishes a LOTE-tunnel at one or more Flexi-Grid nodes 130 by one or more PNCs 135 in one embodiment, but other types of optical paths may be established in a similar manner. A first control command 910, POST/tunnels/tunnel/LOTE-tunnel is sent from PNC 135 to Flexi-Grid node 130, which processes the command and returns a confirmation 920 of HTTP 200: Tunnel, confirming that the tunnel has been established.

Figure 10:
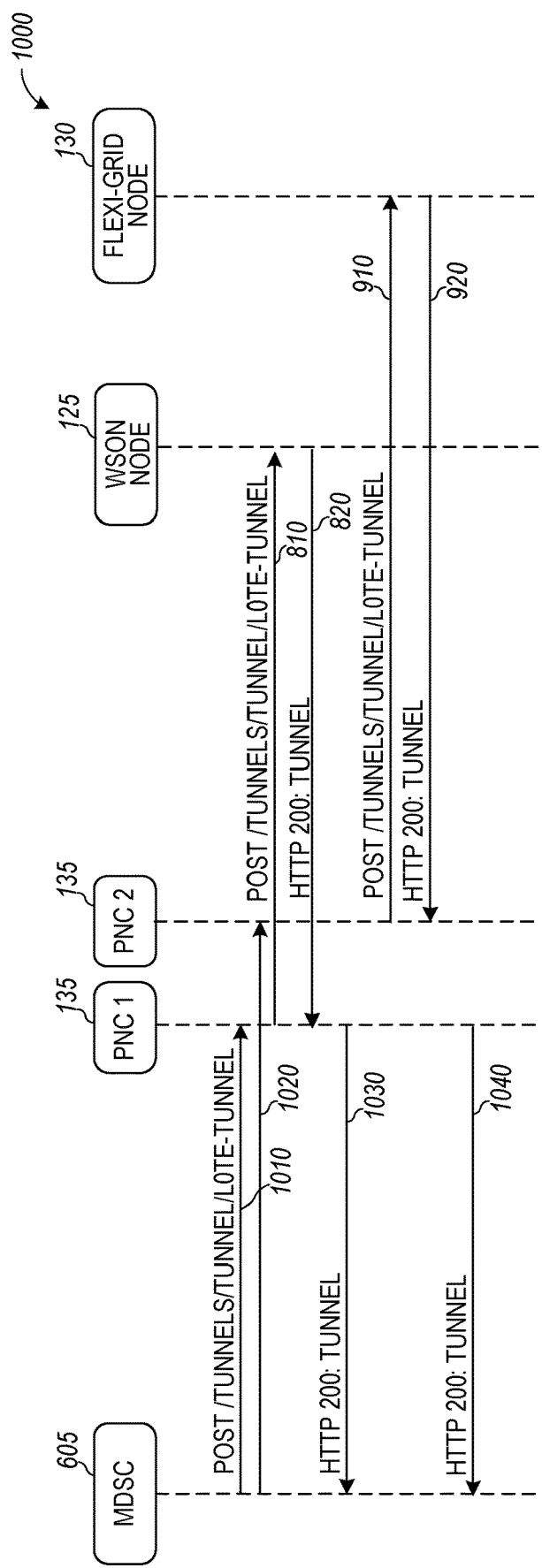
FIG. 10 is a diagram showing configuration message flow for configuring an optical path or tunnel via a diverse set of control nodes in an optical network according to an example embodiment.

FIG. 10 is a diagram showing configuration message flow 1000 for configuring an optical path or tunnel in an optical network having a diverse mix of nodes, such as WSON nodes 125 and Flexi-Grid nodes 135. Flow 1000 establishes a LOTE-tunnel at one or more nodes 125, 130 by one or more PNCs 135 in one embodiment. An MDSC 605 is used to establish the optical path over multiple domains controlled by multiple PNCs 135. Two POST requests 1010 and 1020 are used for respective PNCs 135. Both PNCs send POST requests 810 and 910 to respective types of nodes and receive confirmations 820 and 920 as described with respect to FIGS. 8 and 9. Each PNC 135 for the different domains forward the respective confirmations 1030 and 1040 back to the MDSC to establish the tunnel/optical path. While only two PNCs 135 and nodes 125, 130 are shown, it should be understood that there may be many more such PNCs and nodes involved in the path, and that such domains may each have mixed nodes or homogenous nodes—nodes of the same type.

Figure 11:
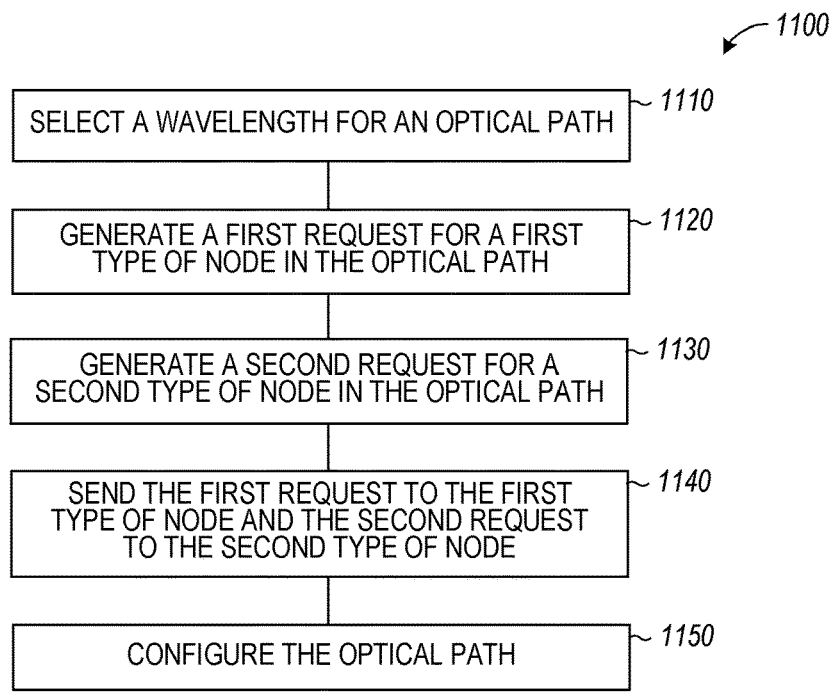
FIG. 11 is a flowchart illustrating a computer implemented method of configuring an optical network according to an example embodiment.

FIG. 11 is a flowchart illustrating operations for execution by suitable computing resources, such as a PNC or a node controller in an optical network, to perform an example method 1100 of configuring an optical network having mixed nodes while using a single joint configuration model. Operation 1110 may be performed to select a wavelength for the optical path. The wavelength may be selected randomly or assigned by a multi-domain controller in different embodiments. Operation 1120 may be executed to generate a first request for a first type of node in the optical path. Operation 1130 may be executed to generate a second request for a second type of node in the optical path. The second type of node may have different data plane capabilities than the first type of node. The first and second requests may be generated as a function of the joint configuration model accommodating both types of nodes. Operation 1140 may be performed to send the first request to the first type of node and the second request to the second type of node to configure the optical path at operation 1150.

In one embodiment the first and second types of nodes have wavelength capabilities that are specified differently in their respective requests. The first and second requests may be generated and sent via a provisioning network controller node in communication with the first and second type nodes. In a further embodiment, the first and second requests may be generated and sent via a multi-domain service coordinator communicatively coupled to heterogeneous provisioning network controller nodes. Each controller node may be in communication with multiple first or second type nodes in the optical path.

The first type of node may comprise a WSON node and the second type of node may comprise a Flexi-Grid node. The first request may specifies a path frequency and channel spacing of the optical path and the second request specifies the frequency and channel spacing as a function of a multiple of slot widths of the Flexi-Grid node to match the channel spacing specified for the WSON node.

The first request for the WSON directly specifies the path frequency $f_p$ and channel spacing $f_{cs}$, and the second request for the Flexi-Grid node specifies the same path frequency as $(f_p = f_p + n \times 0.00625)$ where n=0, and channel spacing as $(f_{cs} = M \times 12.5)$ where M=4. The joint configuration model may be in the form of a compiled YANG tree.

Figure 12:
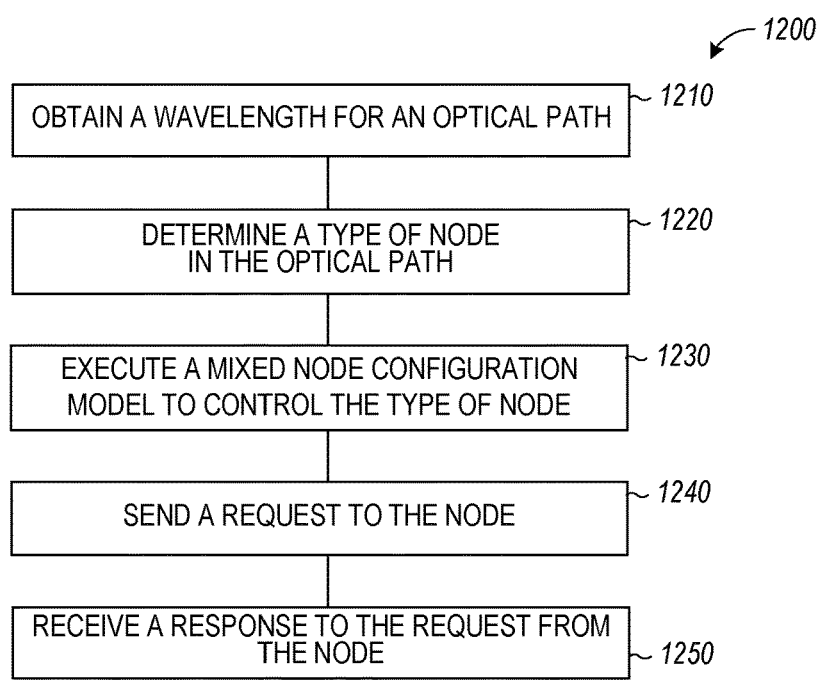
FIG. 12 is a flowchart illustrating operations for performing a method of configuring an optical network having mixed nodes while using a single joint configuration model.

FIG. 12 is a flowchart illustrating operations for execution by suitable computing resources, such as a PNC or node controller in an optical network, to perform an example method 1200 of configuring an optical network having mixed nodes while using a single joint configuration model. At operation 1210, a channel wavelength for an optical path may be obtained. Obtaining such a wavelength may be performed by receiving the wavelength from another controller or generating it randomly responsive to a request for an optical path. Operation 1220 determines a type of node in the optical path.

Operation 1230 involves executing a mixed node configuration model to determine how to control the type of node. The mixed node configuration model is used for configuring multiple different types of nodes which each have different control plane capabilities and may differ in the way channel parameters are specified to control the type of node coupled to the controller. The configuration plane determines, based on the node type, how to specify the channel parameters. At operation 1240, a configuration request is sent to the node in accordance with the configuration model, and at operation 1250, a response may be received from the node, confirming the request.

The method 1200 may be used multiple times by one or more controllers which may be controlling different domains of nodes in a large optical network. The use of a joint configuration file enables configuration of mixed nodes throughout the domains without having to ensure each controller has a different or multiple different configuration files for each of the types of nodes in their respective domains.

Figure 13:
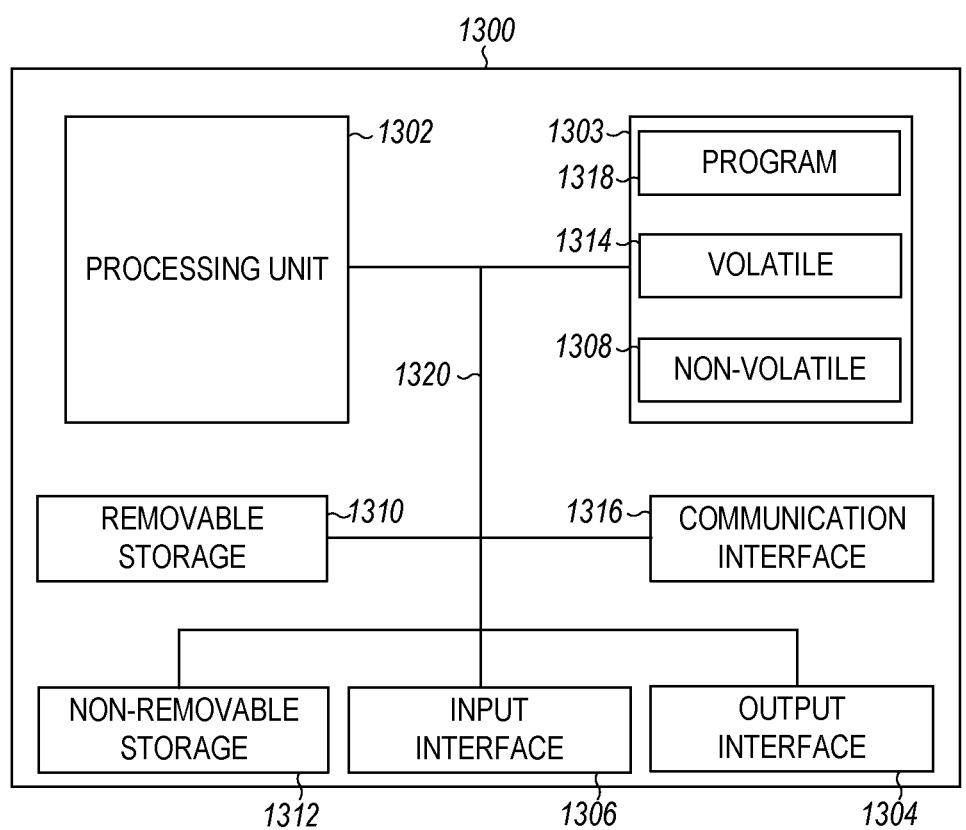
FIG. 13 is a block diagram illustrating circuitry for clients, servers, cloud based resources for implementing algorithms and performing methods according to example embodiments.

FIG. 13 is a block diagram illustrating circuitry/programming resources for using a joint configuration model for configuring mixed nodes in an optical network to establish a tunnel/optical path through the network regardless of the use of different types of nodes in the resulting path and for performing methods according to example embodiments. All components need not be used in various embodiments.

One example computing device in the form of a computer 1300 may include a processing unit 1302, memory 1303, removable storage 1310, and non-removable storage 1312. Although the example computing device is illustrated and described as computer 1300, the computing device may be in different forms in different embodiments. For example, the computing device may instead be a smartphone, a tablet, smartwatch, controller, or other computing device including the same or similar elements as illustrated and described with regard to FIG. 13. Devices, such as smartphones, tablets, and smartwatches, are generally collectively referred to as mobile devices or user equipment. Further, although the various data storage elements are illustrated as part of the computer 1300, the storage may also or alternatively include cloud-based storage accessible via a network, such as the Internet or server based storage.

Memory 1303 may include volatile memory 1314 and non-volatile memory 1308. Computer 1300 may include— or have access to a computing environment that includes—a variety of computer-readable media, such as volatile memory 1314 and non-volatile memory 1308, removable storage 1310 and non-removable storage 1312. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1300 may include or have access to a computing environment that includes input interface 1306, output interface 1304, and a communication interface 1316. Output interface 1304 may include a display device, such as a touchscreen, that also may serve as an input device. The input interface 1306 may include one or more of a touchscreen, touchpad, mouse, keyboard, camera, one or more device-specific buttons, one or more sensors integrated within or coupled via wired or wireless data connections to the computer 1300, and other input devices. The computer may operate in a networked environment using a communication connection to connect to one or more remote computers, such as database servers. The remote computer may include a personal computer (PC), server, router, network PC, a peer device or other common DFD network switch, or the like.

The communication connection may include a Local Area Network (LAN), a Wide Area Network (WAN), cellular, WiFi, Bluetooth, optical, or other networks. According to one embodiment, the various components of computer 1300 are connected with a system bus 1320.

Computer-readable instructions stored on a computer-readable medium are executable by the processing unit 1302 of the computer 1300, such as a program 1318. The program 1318 in some embodiments comprises software that, when executed by the processing unit 1302, performs node configuration operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1318 may be used to cause processing unit 1302 to perform one or more methods or algorithms described herein.

EXAMPLES

In example 1, a computer implemented method of configuring an optical path includes selecting with one or more processors a wavelength for the optical path, generating with one or more processors, a first request for a first type of node in the optical path, generating with one or more processors a second request for a second type of node in the optical path, the second type of node having different data plane capabilities than the first type of node, wherein the first and second requests are generated as a function of a joint configuration model accommodating both types of nodes, and sending the first request from the one or more processors to the first type of node and the second request to the second type of node to configure the optical path.

Example 2 includes the method of example 1 wherein the first and second types of nodes have wavelength data plane capabilities that are specified differently in their respective requests.

Example 3 includes the method of any of examples 1-2 wherein the first and second requests are generated and sent via one or more processors of a provisioning network controller node in communication with the first and second types of nodes.

Example 4 includes the method of any of examples 1-3 wherein the first and second requests are generated responsive to a multi-domain service coordinator having one or more processors communicatively coupled to heterogeneous provisioning network controller nodes, each controller node in communication with multiple first or second type nodes in the optical path.

Example 5 includes the method of any of examples 1-4 wherein the first type of node comprises a wavelength switched optical network (WSON) node and the second type of node comprises a Flexi-Grid node.

Example 6 includes the method of example 5 wherein the first request specifies a path frequency and channel spacing of the optical path and the second request specifies the path frequency and channel spacing as a function of a multiple of slot widths of the Flexi-Grid node to match the channel spacing specified for the WSON node.

Example 7 includes the method of example 6 wherein the first request for the WSON directly specifies the path frequency (fp) and channel spacing (fcs), and the second request for the Flexi-Grid node specifies the path frequency as (fp=fp+n×0.00625) where n=0, and channel spacing as (fcs=M×12.5) where M=4.

Example 8 includes the method of any of examples 1-7 wherein the joint configuration model comprises a compiled YANG tree.

Example 9 includes the method of any of examples 1-8 wherein the first and second requests are hypertext transfer protocol (HTTP) POST requests.

In example 10, an optical network node controller includes a memory storage comprising instructions and one or more processors in communication with the memory storage. The one or more processor execute the instructions to perform operations including selecting with one or more processors a wavelength for an optical path, generating with one or more processors, a first request for a first type of node in the optical path, generating with one or more processors a second request for a second type of node in the optical path, the second type of node having different data plane capabilities than the first type of node, wherein the first and second requests are generated as a function of a joint configuration model accommodating both types of nodes, and sending the first request from the one or more processors to the first type of node and the second request to the second type of node to configure the optical path.

Example 11 includes the optical network node controller of example 10 wherein the first and second requests are generated responsive to a multi-domain service coordinator having one or more processors communicatively coupled to heterogeneous provisioning network controller nodes, each controller node in communication with multiple first or second type nodes in the optical path.

Example 12 includes the optical network node controller of any of examples 10-11 wherein the first type of node comprises a wavelength switched optical network (WSON) node and the second type of node comprises a Flexi-Grid node.

Example 13 includes the optical network node controller of example 12 wherein the first request specifies a path frequency and channel spacing of the optical path and the second request specifies the path frequency and channel spacing as a function of a multiple of slot widths of the Flexi-Grid node to match the channel spacing specified for the WSON node.

Example 14 includes the optical network node controller of example 13 wherein the first request for the WSON directly specifies the path frequency (fp) and channel spacing (fcs), and the second request for the Flexi-Grid node specifies the path frequency as (fp=fp+n×0.00625) where n=0, and channel spacing as (fcs=M×12.5) where M=4.

Example 15 includes the optical network node controller of any of examples 10-14 wherein the joint configuration model comprises a compiled YANG tree and wherein the first and second requests are in the form of hypertext transfer protocol (HTTP) POST requests.

In example 16, a non-transitory computer-readable media storing computer instructions for configuring nodes in an optical network, that when executed by one or more processors, cause the one or more processors to perform steps of selecting with one or more processors a wavelength for an optical path, generating with one or more processors, a first request for a first type of node in the optical path, generating with one or more processors a second request for a second type of node in the optical path, the second type of node having different data plane capabilities than the first type of node, wherein the first and second requests are generated as a function of a joint configuration model accommodating both types of nodes, and sending the first request from the one or more processors to the first type of node and the second request to the second type of node to configure the optical path.

Example 17 includes the non-transitory computer-readable media of example 16 wherein the first and second types of nodes have wavelength data plane capabilities that are specified differently in their respective requests.

Example 18 includes the non-transitory computer-readable media of any of examples 16-17 wherein the first type of node comprises a wavelength switched optical network (WSON) node and the second type of node comprises a Flexi-Grid node, and wherein the first request specifies a path frequency and channel spacing of the optical path and the second request specifies the path frequency and channel spacing as a function of a multiple of slot widths of the Flexi-Grid node to match the channel spacing specified for the WSON node.

Example 19 includes the non-transitory computer-readable media of example 18 wherein the first request for the WSON directly specifies the path frequency (fp) and channel spacing (fcs), and the second request for the Flexi-Grid node specifies the path frequency as (fp=fp+n×0.00625) where n=0, and channel spacing as ($f_{cs}$=M×12.5) where M=4.

Example 20 includes the non-transitory computer-readable media of any of examples 16-19 wherein the first and second requests are in the form of hypertext transfer protocol (HTTP) POST requests.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer implemented method of configuring an optical path, the method comprising:

selecting with one or more processors a wavelength for the optical path;

generating with one or more processors, a first request for a first type of node in the optical path;

generating with one or more processors a second request for a second type of node in the optical path, the second type of node having different data plane capabilities than the first type of node and using different specification of configuration parameters to control the different data plane capabilities, wherein the first and second requests are generated as a function of a joint configuration model accommodating both types of nodes; and sending the first request from the one or more processors to the first type of node and the second request to the second type of node to configure the optical path.

2. The method of claim 1 wherein the first and second types of nodes have wavelength data plane capabilities that are specified differently in their respective requests.

3. The method of claim 1 wherein the first and second requests are generated and sent via one or more processors of a provisioning network controller node in communication with the first and second types of nodes.

4. The method of claim 1 wherein the first and second requests are generated responsive to a multi-domain service coordinator having one or more processors communicatively coupled to heterogeneous provisioning network controller nodes, each controller node in communication with multiple first or second type nodes in the optical path.

5. The method of claim 1 wherein the first type of node comprises a wavelength switched optical network (WSON) node and the second type of node comprises a Flexi-Grid node.

6. The method of claim 5 wherein the first request specifies a path frequency and channel spacing of the optical path and the second request specifies the path frequency and channel spacing as a function of a multiple of slot widths of the Flexi-Grid node to match the channel spacing specified for the WSON node.

7. The method of claim 6 wherein the first request for the WSON directly specifies the path frequency ($f_p$) and channel spacing ($f_{cs}$), and the second request for the Flexi-Grid node specifies the path frequency as ($f_p$=$f_p$+n×0.00625) where n=0, and channel spacing as ($f_{cs}$=M×12.5) where M=4.

8. The method of claim 1 wherein the joint configuration model comprises a compiled YANG tree.

9. The method of claim 1 wherein the first and second requests are hypertext transfer protocol (HTTP) POST requests.

10. An optical network node controller comprising:

a memory storage comprising instructions; and one or more processors in communication with the memory storage, wherein the one or more processors execute the instructions to perform operations comprising:

selecting with one or more processors a wavelength for an optical path;

generating with one or more processors, a first request for a first type of node in the optical path;

generating with one or more processors a second request for a second type of node in the optical path, the second type of node having different data plane capabilities than the first type of node and using different specification of configuration parameters to control the different data plane capabilities, wherein the first and second requests are generated as a function of a joint configuration model accommodating both types of nodes; and sending the first request from the one or more processors to the first type of node and the second request to the second type of node to configure the optical path.

11. The optical network node controller of claim 10 wherein the first and second requests are generated responsive to a multi-domain service coordinator having one or more processors communicatively coupled to heterogeneous provisioning network controller nodes, each controller node in communication with multiple first or second type nodes in the optical path.

12. The optical network node controller of claim 10 wherein the first type of node comprises a wavelength switched optical network (WSON) node and the second type of node comprises a Flexi-Grid node.

13. The optical network node controller of claim 12 wherein the first request specifies a path frequency and channel spacing of the optical path and the second request specifies the path frequency and channel spacing as a function of a multiple of slot widths of the Flexi-Grid node to match the channel spacing specified for the WSON node.

14. The optical network node controller of claim 13 wherein the first request for the WSON directly specifies the path frequency ($f_p$) and channel spacing ($f_{cs}$), and the second request for the Flexi-Grid node specifies the path frequency as ($f_p=f_p+n\times0.00625$) where n=0, and channel spacing as ($f_{cs}=M\times12.5$) where M=4.

15. The optical network node controller of claim 10 wherein the joint configuration model comprises a compiled YANG tree and wherein the first and second requests are in the form of hypertext transfer protocol (HTTP) POST requests.

16. A non-transitory computer-readable media storing computer instructions for configuring nodes in an optical network, that when executed by one or more processors, cause the one or more processors to perform steps of:

selecting with one or more processors a wavelength for an optical path;

generating with one or more processors, a first request for a first type of node in the optical path;

generating with one or more processors a second request for a second type of node in the optical path, the second type of node having different data plane capabilities than the first type of node and using different specification of configuration parameters to control the different data plane capabilities, wherein the first and second requests are generated as a function of a joint configuration model accommodating both types of nodes; and sending the first request from the one or more processors to the first type of node and the second request to the second type of node to configure the optical path.

17. The non-transitory computer-readable media of claim 16 wherein the first and second types of nodes have wavelength data plane capabilities that are specified differently in their respective requests.

18. The non-transitory computer-readable media of claim 16 wherein the first type of node comprises a wavelength switched optical network (WSON) node and the second type of node comprises a Flexi-Grid node, and wherein the first request specifies a path frequency and channel spacing of the optical path and the second request specifies the path frequency and channel spacing as a function of a multiple of slot widths of the Flexi-Grid node to match the channel spacing specified for the WSON node.

19. The non-transitory computer-readable media of claim 18 wherein the first request for the WSON directly specifies the path frequency ($f_p$) and channel spacing ($f_{cs}$), and the second request for the Flexi-Grid node specifies the path frequency as ($f_p=f_p+n\times0.00625$) where n=0, and channel spacing as ($f_{cs}=M\times12.5$) where M=4.

20. The non-transitory computer-readable media of claim 16 wherein the first and second requests are in the form of hypertext transfer protocol (HTTP) POST requests.

* * * * *